US008589924B1

(12) United States Patent
Johnsen et al.

(10) Patent No.: US 8,589,924 B1
(45) Date of Patent: Nov. 19, 2013

(54) METHOD AND APPARATUS FOR PERFORMING A SERVICE OPERATION ON A COMPUTER SYSTEM

(75) Inventors: Bjørn Dag Johnsen, Oslo (NO); Lars Paul Huse, Oppegård (NO); Daniel Delfatti, Belmont, CA (US)

(73) Assignee: Oracle America, Inc., Redwood Shores, CA (US)

(*) Notice: Subject to any disclaimer, the term of this patent is extended or adjusted under 35 U.S.C. 154(b) by 1568 days.

(21) Appl. No.: 11/477,241

(22) Filed: Jun. 28, 2006

(51) Int. Cl.
*G06F 9/46* (2006.01)

(52) U.S. Cl.
USPC ............................ 718/100; 718/102; 718/104

(58) Field of Classification Search
None
See application file for complete search history.

(56) References Cited

U.S. PATENT DOCUMENTS

| | | | |
|---|---|---|---|
| 5,715,386 A * | 2/1998 | Fulton et al. .................... 714/38 |
| 5,890,134 A * | 3/1999 | Fox ................................. 705/9 |
| 6,625,636 B1 * | 9/2003 | Skovira .......................... 718/102 |
| 6,629,266 B1 * | 9/2003 | Harper et al. .................... 714/38 |
| 6,769,120 B1 * | 7/2004 | Rodriguez ..................... 718/100 |
| 7,272,749 B2 * | 9/2007 | Baglin ............................ 714/24 |
| 7,454,661 B2 * | 11/2008 | Yu .................................. 714/38 |
| 2002/0138235 A1 * | 9/2002 | Edwards et al. ............... 702/184 |
| 2003/0050065 A1 * | 3/2003 | Alletson et al. ............... 455/445 |
| 2003/0079154 A1 * | 4/2003 | Park et al. ......................... 714/1 |
| 2004/0078634 A1 * | 4/2004 | Gilstrap et al. ................... 714/5 |
| 2004/0078721 A1 * | 4/2004 | Williams ........................ 714/46 |
| 2005/0195075 A1 * | 9/2005 | McGraw et al. ............... 340/500 |

* cited by examiner

*Primary Examiner* — Emerson Puente
*Assistant Examiner* — Dong Kim
(74) *Attorney, Agent, or Firm* — Paul, Vaughan, Fleming & Dowler LLP

(57) ABSTRACT

One embodiment of the invention provides a method for performing a service operation on a computer system. The method includes submitting a request for performing a service operation on the computer system and providing an estimated duration of the service operation. The service operation is expected to render one or more resources of the computer system unavailable for the duration of the service operation. It is therefore determined whether or not to accept the requested service operation based on planned usage of the one or more resources for the duration of the service operation.

17 Claims, 4 Drawing Sheets

METHOD AND APPARATUS FOR PERFORMING A SERVICE OPERATION ON A COMPUTER SYSTEM

FIELD OF THE INVENTION

The present invention relates to performing a service operation on a computer system.

BACKGROUND OF THE INVENTION

A computer system provides a collection of hardware resources such as processors, storage units, network interfaces, etc for the performance of computational tasks. These resources may be provided by a single machine or may be distributed across multiple machines. Many computer systems include multiple instances of a given resource. For example, a system may incorporate multiple processing nodes to provide redundancy in case one of the processing nodes fails, in that the other processing nodes remain available to carry out computational tasks.

In some computer systems, the allocation of computational tasks to the available resources in the system, sometimes referred to as service provisioning, is controlled by a resource manager. For example, if an application requires a particular amount of processing power and a particular amount of storage, the resource manager can allocate hardware resources to the application to provide the desired capabilities.

In many installations, the hardware resources belong to or are managed by a service provider, who runs (hosts) applications on behalf of one or more third parties (i.e. customers). The service provider has to match the available resources against the needs of the various applications. In some cases the resources allocated to a particular customer may be fixed, in which case the resource manager just has to balance the allocated resources against the applications for that one customer. In other cases, the resource manager may have to balance the available resources across multiple customers.

One factor that complicates service provisioning for the resource manager is that the available resources may vary with time. For example, a particular hardware resource may fail due to some internal problem, and hence become unavailable. Even if the hardware resource continues to operate properly, there are various reasons why the resource could still become unavailable, such as a network failure that prevents contact with the resource, or some other disruption to a machine that incorporates the hardware resource. For example, the machine may need a service operation in order to repair, replace or upgrade some other component within the machine (hardware or software), and this may then render any hardware resource within the machine unavailable while the service operation is in progress. Similarly, an upgrade to the operating system of the machine may be followed by a system reboot, during which time the hardware resources of the system may be unavailable. One or more hardware resources might also be taken off-line to facilitate testing or servicing of the electrical power circuits, air conditioning facilities and so on for a machine.

Not only are the available resources subject to change with time, but so are the application or workload requirements. For example, if an application relates to online ticket booking, there may be a sudden rise in activity when tickets for a new event are made available. There may also be a rise in activity following television advertisements for the event. In these circumstances, the change in application workload may be somewhat predictable (e.g. based on the known scheduling of television advertisements), in which case the resource manager can perform some advance planning of its service provisioning. In other cases however, the change in activity levels for an application may not be predictable or expected.

The resource manager therefore has the task of matching the available resources against the requirements of various applications on a dynamic basis. This typically involves transferring resources from those applications that are currently under-utilizing their allocated resources (or are relatively insensitive to increased processing delays) to those applications that now require additional resources.

The resource manager may also be constrained by contractual terms between the service provider and the customer. For example, the service provider may guarantee that certain applications will always receive some set minimal level of resources. These restrictions might be dynamic in nature—e.g. a contract between a service provider and a customer might specify that if application activity exceeds a certain threshold, then the service provider will make additional resources available to the application within a specified time limit (say 15 minutes). Another possibility is to include financial incentives in the contract for the service provider to ensure that a particular application is always allocated a given level of resources. This incentive may be in the form of monetary penalties if the resource manager is unable to provide the application with the desired level of resources for a certain time period.

Overall therefore it can be seen that the resource manager has a difficult task in performing a dynamic allocation of the available resources to the requesting applications. Any improvement in how this allocation is performed may lead to improved efficiency in the use of the hardware resources, in particular providing better application performance for a given set of hardware resources.

SUMMARY OF THE INVENTION

Accordingly, one embodiment of the invention provides a method for performing a service operation on a computer system. The method comprises submitting a request for performing a service operation on one or more resources of the computer system. The method further comprises providing an estimated duration for the requested service operation, where the service operation will render the resources of the computer system unavailable for the duration of the service operation. The method further comprises determining whether or not to accept the requested service operation based on planned usage of the one or more resources for the duration of the service operation. Providing an estimated duration for the service operation helps to schedule both the service operation itself and also applications or services to be provided by the computer system.

In one embodiment, the request is submitted to a resource manager for the system. The resource manager uses the estimated duration for the service operation to determine whether or not to accept the requested service operation. Note that a resource manager generally has an abstract or generic view of available system resources, and providing an estimated duration for the service operation is compatible with this abstract view.

In one embodiment, at least one resource is currently unavailable pending completion of the service operation, and providing an estimated duration for the requested service operation includes providing an estimated duration until the start of the service operation. This allows an estimate to be made of when the resource may become available again, by adding the estimated duration of the service operation onto the time until the start of the service operation.

In one embodiment, providing an estimated duration for the service operation comprises storing the estimated duration in a database remotely accessible from the computer system. Another possibility is to store the estimated duration in a field replaceable unit (FRU) to be replaced during the service operation, for example in a FRU ID memory.

Another embodiment of the invention provides a method comprising determining that at least one component within a computer system is suspected of having a fault, where the component provides one or more resources for the computer system. The method further comprises requesting removal of the resource provided by the suspected component, where the request includes an indication that there is a suspected fault. The method further comprises deciding at a resource manager for the computer system whether or not to accept the requested removal. This decision is based on the indication of the suspected fault and the resources that would be lost as a result of the requested removal.

Making the resource manager aware of the underlying motivation for the removal request (the suspected fault) allows the resource manager to make a more appropriate response to the request. For example, the resource manager may transfer services away from a resource provided by a component with a suspected fault to another resource. The resource manager may implement such a transfer on a precautionary basis even if it does not accept the proposed service operation.

Another embodiment of the invention provides a method for performing a service operation on a computer system. The method comprises submitting a request for performing a service operation on N resources of the computer system. The request identifies the N resources and includes an indication that of the N resources, M will be unavailable during the service operation. A determination is then made whether or not to accept the requested service operation. This may include specifying the M resources that should be rendered unavailable for the service operation. The use of such an "M from N" indication provides greater flexibility to the system, and so allows more precise and efficient handling of service operations.

Another embodiment of the invention provides a computer system comprising a resource manager configured to receive a request for performing a service operation on one or more resources of the computer system. The request includes at least one of the following: (a) an estimated duration for the service operation; (b) an indication that the service operation is to remedy a suspected fault within the system; and/or (c) an indication that the service operation will render M out of N specified resources unavailable. The resource manager is configured to determine whether or not to accept the requested service operation based on information included within the request.

Other embodiments of the invention provide a computer program and computer program product for implementing the various methods described above.

BRIEF DESCRIPTION OF THE DRAWINGS

Various embodiments of the invention will now be described in detail by way of example only with reference to the following drawings, in which like reference numerals pertain to like elements, and in which.

DETAILED DESCRIPTION

Figure 1:
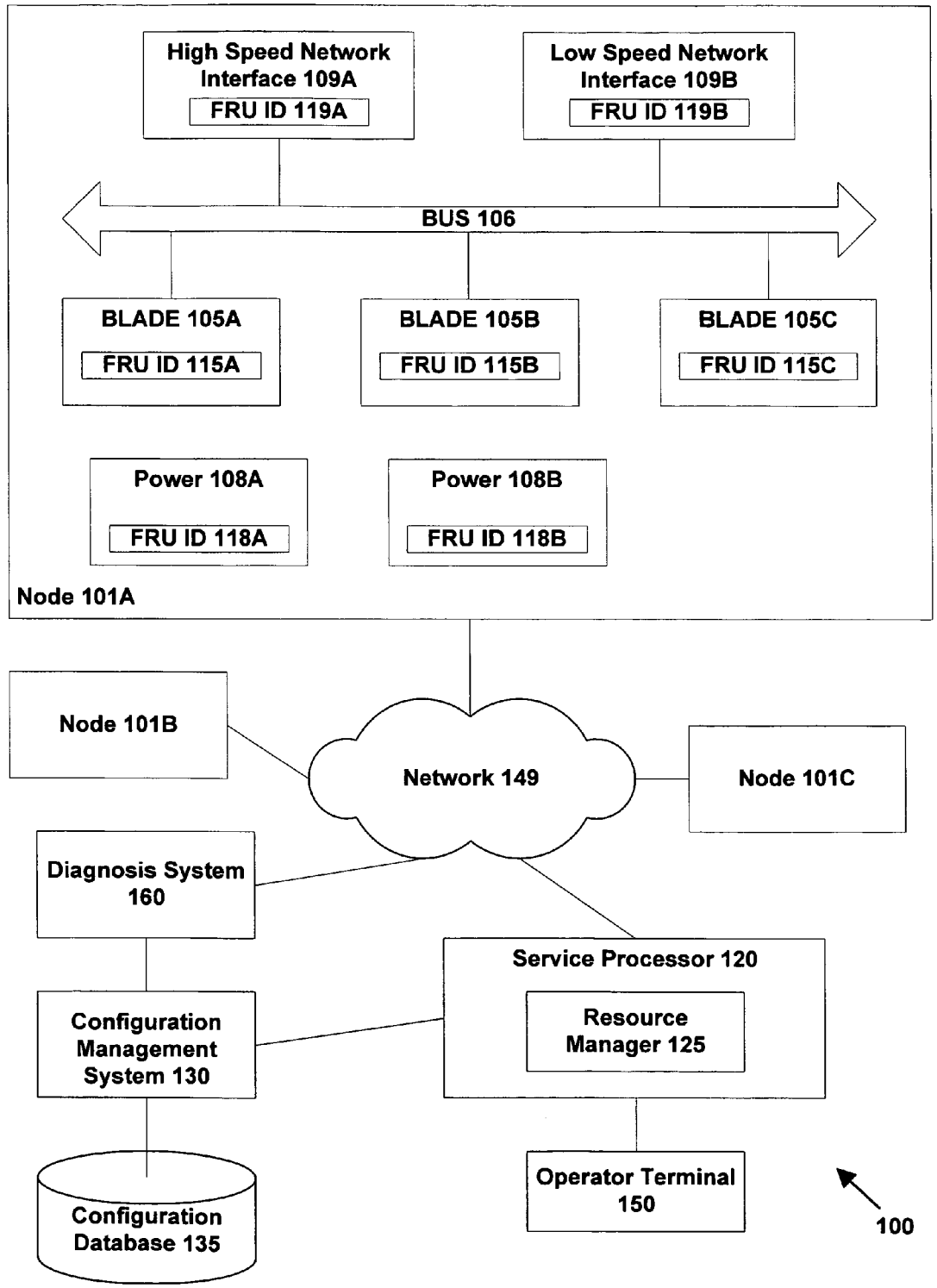
FIG. 1 provides a high-level schematic depiction of a computer system in accordance with one embodiment of the invention.

FIG. 1 is a schematic illustration of a computer system 100 in accordance with one embodiment of the invention. Computer system 100 comprises multiple nodes 101A, 101B, and 101C linked by computer network 149. Computer system 100 may represent a variety of possible architectures. For example, in one embodiment, nodes 101 may represent individual subsystems within a single distributed computer system. In another embodiment, nodes 101 may represent individual servers in a cluster of servers managed as a single group. In another embodiment, nodes 101 may represent communications nodes (switches or end-points) within network 149, in which case system 100 may correspond to the overall network. It will be appreciated that other systems may have more or fewer nodes than system 100 as shown in FIG. 1; in addition, the topology of network connections between the nodes may vary as appropriate.

FIG. 1 illustrates components within one node 101A in more detail (for clarity the internal structure of the remaining computing nodes 101B, 101C is omitted). The components shown in FIG. 1 correspond to an example embodiment where node 101A represents a server, but will vary as appropriate for other embodiments and implementations. It will be appreciated that the remaining nodes 101B, 101C of system 100 may have a structure that is generally analogous to that of node 101A, but the number, type and configuration of components within a given node may vary from one node to another.

Node 101A is shown in FIG. 1 as comprising three compute blades 105A, 105B, 105C (although in practice the number of blades in a server is likely to be much higher). Each blade is linked via bus 106 to a high-speed network interface 109A and also to a low-speed network interface 109B. Node 101A further comprises two power supplies, 108A, 108B. Providing redundant combinations of components, such as multiple blades 105 and multiple power supplies 108 within node 101A, implies that a single point of failure within one redundant component is not fatal for the corresponding subsystem.

In the present implementation, we assume that if there is only one power supply operational in node 101A, this provides enough power for two blades but not enough power for three blades. In other words, one of the blades in node 101A must be shut down if power supply 108A or 108B becomes unavailable, for example because of maintenance, but the two other blades can remain operational. Hence node 101A can continue at 66% of full processing capacity if one power supply is lost (compared to the loss of all processing capacity if there were no redundancy in power supply units).

Blades 105, power supplies 108 and network interfaces 109 represent field replaceable units (FRUs). An FRU represents a component that can be removed or replaced in its entirety by a service engineer in the field. Such a service operation might be triggered by the need to replace a faulty FRU, or to upgrade a system by inserting a new, more powerful FRU, or to remove a FRU, perhaps for use in another node.

Note that a FRU may incorporate one or more smaller FRUs. For example a server blade 105 might include a processor, memory, and possibly disk storage. Each of these components could then be provided as a separate FRU within the blade 105 in order to allow replacement or upgrade as necessary. For clarity, these additional possible levels for a hierarchy of FRUs are omitted from FIG. 1.

Each FRU in system 100 is provided with a memory, such as an electronically erasable programmable read only memory (EEPROM). This memory is used to store various information about the FRU, including identifying (ID) information such as device type and serial number. Thus as shown in FIG. 1, blades 105 include FRU ID information 115, power supplies 108 include FRU ID information 118, and network interfaces 109 include FRU ID information 119. Other details may be stored as appropriate in the FRU ID memory, such as manufacturer, manufacture date and so on.

Computer system 100 also includes a service processor 120 which is responsible for the general management of computer system 100. Resource manager 125 runs on the service processor 120. Linked to service processor 120 is operator terminal 150. Operator terminal 150 also allows a user to provide various commands and control information to computer system 100, such as configuration instructions and parameters. Note that if system 100 comprises a communication network, then a subnet manager may be used instead of service processor 120 to control configuration and general operations involving the network and the nodes in the network.

Computer system 100 further includes a configuration database 135 which is used by system 100 to store data about the identity and interconnection of the various components within computer system 100. For example, the information in configuration database 135 may indicate that blades 105A, 105B and 105C are all present and connected to bus 106. The configuration database 135 may also store information to the effect that node 101A has two power supplies 108A, 108B, and that these are redundant, thereby allowing node 101A to continue operations with two blades (but no more), even if one of the two power supplies were to fail.

The configuration database 135 is accessed via configuration management system 130. Thus user configuration commands entered into operator terminal 150 are passed by the service processor 120 to configuration management system 130 for implementation, and the results are saved into the configuration database 135. The configuration management system 130 may also be responsible for preventing the user from setting a configuration that might damage the system. For example, thermal considerations may limit the amount of processing power that can be connected to bus 106. The configuration management system 130 can then be used to ensure that the number and/or power of the blades 105 attached to bus 106 do not contravene this limit.

It will be appreciated that the components of system 100 and individual nodes 101 are not necessarily fixed permanently, but rather the components within system 100 may change with time. For example, node 101A may have a blade removed or an additional blade inserted. For each such change, the configuration management system 130 updates the configuration database 135 accordingly.

Computer system 100 further includes a diagnosis unit 160 (in other embodiments the diagnosis unit 160 may be separate, e.g. remote from computer system 100). The diagnosis system receives reports of errors within the system (at the hardware and/or level). Based on these reports and an understanding of the system configuration obtained from configuration database 135, the diagnosis system attempts to determine the cause of the error reports, and in particular to identify any component that is faulty. As an example, if diagnosis system 160 receives an error report from blade 105A that it cannot contact network interface 109A, then this may be due to a problem with blade 105A itself, network interface 109A going down, or some problem on bus 106. Thus blade 105A, network interface 109A and bus 106 may all be on a suspect list for the fault. However, if similar error reports are also received from blades 105B and 105C, but only in relation to high-speed interface 109A (and not in relation to low-speed interface 109B), then this suggests to the diagnosis system that the fault lies within the high-speed interface 109A itself. Accordingly, the diagnosis system may remove bus 106 and blades 105 from the suspect list, leaving only high-speed interface 109A on the list. One embodiment of a diagnosis system is described in U.S. patent application Ser. No. 10/880,253, filed 29 Jun. 2004, entitled "A System and Method for Automated Problem Diagnosis", which is incorporated herein by reference.

The resource manager 125 views computer system 100 as a logical set of computational resources. For example, blades 105A, 105B, and 105C each provide some level of processing resource, while each of network interfaces 109A and 109B provides a communications resource. However, resource manager is not generally concerned at the level of physical components, and so would not maintain information about support components such as power supplies 108A, 108B. This allows the resource manager to be written in generic function, and so it does not need to be modified or updated for each new hardware release, etc.

Figure 2:
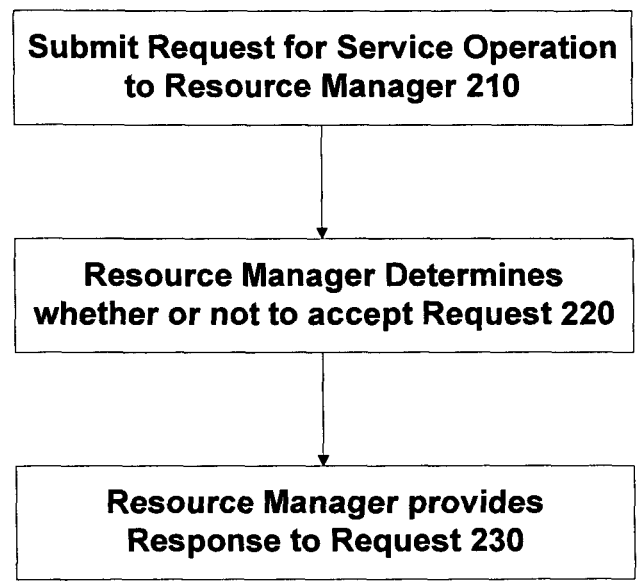
FIG. 2 provides a high-level flowchart showing the handling of a request for a service operation in the computer system of FIG. 1 in accordance with one embodiment of the invention.

FIG. 2 is a flowchart illustrating at a high-level the handling of a requested service operation in accordance with one embodiment of the invention. The requested service operation may be implemented using the communications scheme set out in U.S. patent application Ser. No. 11/061,236, filed 17 Feb. 2005, entitled "Computer Network", and assigned to the same assignee as the present application (in which case the configuration manager 130 acts as the box manager and the resource manager 125 acts as the fabric manager). U.S. application Ser. No. 11/061,236 is hereby incorporated by reference into the present application.

The processing of FIG. 2 starts with the resource manager 125 receiving a request for a service operation (210). Note that the requested service operation may represent any form of operation that (potentially) impacts the available resources on system 100. For example, a service operation might be the removal, repair, replacement, or modification (e.g. an upgrade) of one or more components within system 100. A requested service operation might also comprise maintenance of one or more components, or configuration, deconfiguration, or reconfiguration of one or more components. A requested service operation might also comprise a system reboot for a component or node, an application restart or transfer to another node, and so on.

The request may originate from any appropriate source, whether internal or external to system 100. For example, the request may come from a service engineer or system administrator using operator terminal 150. The request may also come from diagnosis system 160, in response to detecting some fault within system 100. The request may also come from configuration manager 130. Note also that the configuration manager may mediate requests between other components and the resource manager. In particular, the configuration manager 130 may be responsible for determining the impact on resources of a particular service operation. For example, if the operator terminal 150 or diagnosis system 160 requests a service operation on power supply 108A, this request may be routed first to the configuration manager, which understands that removal of the power supply 108A has an impact on the availability of blade resources 105A, 105B, and 105C. The configuration manager 130 can then submit to the resource manager 125 a request for this service operation in terms that are meaningful to the resource manager. In particular, the request from the configuration manager specifies the effect of the intended service operation on the resources of system 100, namely blades 105 (as described in more detail below), rather than on other support components, such as power supply 208A, that are not of direct interest to the resource manager.

In response to the request, the resource manager determines whether or not to accept the request (220). This decision can be based on information included within the request, as well as current and planned (scheduled) use of any system resources that might be unavailable prior to and/or during the service operation. In making this decision, the resource manager may modify its current and/or planned future resource utilisation to better accommodate the requested service operation. The decision of the resource manager may be further influenced by one or more service level agreements (SLAs) that apply to system 100, which may specify that a particular service level must be provided to the relevant customer(s).

Based on its decision, the resource manager then provides an appropriate response to the request (230). In some cases the response may be simply Yes or No. In other cases, the resource manager may provide a more graduated response, for example from 0-5, where 0 would indicate that the requested service operation can be easily accommodated (i.e. accepted), while 5 would indicate that the requested service operation would cause major or complete disruption to processing (e.g. application). It will be appreciated that intermediate values in the response would then indicate a more moderate level of application disruption by the requested service operation. As described in more detail below, the resource manager may also provide further information in its response, for example, a proposed start time for the service operation.

In general the response provided by the resource manager is returned to the device that submitted the original request for the service operation, which is then responsible for scheduling and controlling the service operation. Note that the requester may or may not adhere to the response from the resource manager. For example, a service engineer may remove a component from a first system for use in a second system where the latter is running a more important application, even if the resource manager on the first system disapproves removal of the component. Note also that although FIG. 2 only illustrates a single exchange of messages with the resource manager, there may be multiple such exchanges as the requestor and resource manager negotiate to determine how the requested service operation can best be accommodated within the system processing requirements.

In conventional systems, the information that has been provided to the resource manager in the request of operation 210 has generally been very limited—usually just the identity of the resources impaired by the service operation. This has made it difficult for the resource manager to make an informed and optimal decision about whether or not to accept the requested operation, and if so, how best to accommodate the request from a scheduling perspective. This in turn can lead to an inefficient utilisation of the resources available within system 100.

One particular problem arises in the situation mentioned above, where the service operation requests to take down a power supply 108A (e.g. for maintenance). As previously indicated, the configuration manager 130 is aware that this will also require one of the blades 105A, 105B, 105C to be taken down to stay within the overall power budget. However, the configuration manager 130 does not know the usage patterns and application status of the different blades, since these are determined by the resource manager 125. Accordingly, it is difficult for the configuration manager 130 to make a sensible decision about which blade 105A, 105B, 105C to take offline while the power supply maintenance operation is being performed.

Conventional protocols between the configuration manager 130 and the resource manager 125 are based on the configuration manager 130 notifying the resource manager of one or more components to shut down, and the resource manager approving or rejecting such operations. In the present situation, one possibility is for the configuration manager 130 to select one of the blades 105A to shut down during the power supply maintenance. This selection may be made on a random or predetermined basis, or perhaps using some semi-objective information available to the configuration manager (such as choosing the blade with the lowest current processor usage). The configuration manager then notifies the resource manager of its blade selection.

Note that the configuration manager cannot notify the resource manager that a power supply 108A rather than a blade 105 is to be shut down, since components such as power supplies 108 are supposed to be transparent to the resource manager. Accordingly, from the perspective of the resource manager 125, it receives an indication from the configuration manager that a particular blade is to be taken down. This will appear to the resource manager as if the blade itself needs a service operation, and the resource manager is unaware that the loss of the blade is only a consequence of some other service operation (to a support system). As a result, the resource manager has no way of knowing that it might be possible to lose a different blade instead of the one selected by the configuration manager.

In response to the notification from the configuration manager, the resource manager may accept or refuse the request (a refusal might be appropriate for example if the requested blade were performing some mission critical application). In accepting the request, the resource manager may decide or need to transfer processing from the blade selected by the configuration manager to a different blade. While such a transfer may mitigate the loss of one blade, there is normally some penalty associated with such a transfer, for example, the time spent relocating and restarting the application. In other situations, it may in fact not be possible to transfer the application from one blade to another. For example, the different blades 105A, 105B, and 105C may have different properties in terms of processing power, memory capacity, and so on, and while one blade may have sufficient resources (e.g. memory) to run an application, the other two blades may not (or at least, not to run the application so efficiently). In such circumstances, if a request arrives to shut down the blade on which the application is running, the resource manager may decide to refuse the request to allow the application to continue.

If the request is refused, the configuration manager might then try to request shutdown of another blade instead (and likewise to request shutdown of a third blade if the requested shutdown of the second blade is refused). Although this approach increases the likelihood of the configuration manager being able to shut down a blade, it does not necessarily lead to the most efficient choice of blade to shut down. For example, consider the situation where blade 105A is running application A that requires certain resources only available on blade 105A, blade 105B is running application B at 50% capacity, while blade 105C is running low priority application C at 10% capacity. Configuration manager 130 may first request to shut down blade 105A, but have this request refused by the resource manager to allow application A to continue. Configuration manager may then request to shut down blade 105B. The resource manager 125 may agree to this request, transferring application B to blade 105C. It will be appreciated however that this is a less than optimal approach. Firstly, the configuration manager has exchanged multiple requests with the resource manager (two in this case, but potentially more for more complex configurations). Secondly, it may be simpler and more efficient for the resource manager 125 to shut down blade 105C and transfer application C to blade 105B (rather than to shut down blade 105B and to transfer application B to blade 105C); however, the resource manager 125 is never aware of this possibility.

Accordingly, one embodiment of the present invention provides a protocol for communication between the configuration manager 130 (or other request source) and the resource manager 125. The protocol addresses the situation described above by allowing the configuration manager 130 to specify or request an "M from N" shutdown. In other words, the request identifies N resources to the resource manager, and indicates or requests that at least M of the identified resources should be taken down for the requested service operation. The protocol therefore allows the configuration manager to express accurately the options available to the resource manager 125, which can then make the best decision in terms of resource utilisation when responding to the requested service operation.

Note that the N resources specified in the request need not all be identical. However, the protocol is of particular benefit where the resources specified in the request are at least broadly similar, such as different blades or nodes in a communications system, since in this case the specified resources are most likely to represent viable alternatives for the resource manager to maintain. Note also that the value of N may be listed explicitly in the protocol, or alternatively, the value of N may be implicit, based on the number of individual resources separately identified in a request.

As an example of the use of this protocol, consider the situation described above relating to the servicing of power supply 108A and the need to remove one of blades 105A, 105B, and 105C. In this case M=1, since one blade must be shutdown, and N=3, since there are three possible blades to choose from. Assuming again that application A runs on (and is limited to) blade 105A, application B runs on blade 105B, and application C runs on blade 105C, the resource manager might now determine that blade 105C can be most conveniently shut-down and respond to the configuration manager accordingly (with application C then being transferred to blade 105B).

It will be appreciated that protocol described above is generic, in that it can also be used for the more common situation where the configuration manager simply identifies a set of one or more components, and all identified components must be shut down for the service operation to proceed. In particular, in such circumstances M=N, in which case the resource manager knows that the configuration manager is asking to take down all the specified resources (without providing any flexibility to the resource manager).

Although in some cases the resource manager may respond to an "M from N" request by specifically identifying the M resources that it wants or prefers to be taken down, other response formats are possible. For example, the resource manager may simply accept the requested service operation, without identifying any resources in particular. In this case, the configuration manager would be free to select itself which of the N resources to take down for the service operation according to any appropriate criteria (e.g. age, ease of access, etc). Alternatively, the resource manager may select some but not all of resources to be taken down (say J, where J<M), thereby allowing the configuration manager or other appropriate device to select the remaining M-J resource to take off-line. Another possibility is that rather than specifying which resources to take down, the resource manager specifies resources that should not be taken down. For example, the resource manager may specify K resources to maintain (K<N-M), with the configuration manager then selecting M resources to take down from the remaining N-K resources. Note that in circumstances where the resource manager allows the configuration manager or other appropriate device some say in selecting which resources to take down, the configuration manager may be required to notify the resource manager of its selection(s).

The protocol described above provides a flexible and powerful approach for submitting service operation requests to the resource manager without requiring the resource manager to know about anything beyond the resources being managed. In particular, the resource manager does not have to understand the underlying cause of the M from N condition, for example the power supply configuration of FIG. 1, and hence can maintain its high level, generic perspective of system 100.

As well as accepting or rejecting requests to take down resources, resource manager 125 is also responsible for scheduling tasks to be performed on system 100, based on operator input of the desired tasks. Table 1 illustrates an example of such a schedule. The schedule comprises multiple lines, where each line corresponds to a particular application (denoted schematically as A, B, C, and D). For each application, a start time is set. In general the start time for an application is set by the operator. However, there may also be certain applications where the start time is flexible; in such circumstances, the resource manager itself may decide when to start the application to best fit in within other workload demands on the system.

In addition, for one application (application B) an end time is set. No end time is set for the remaining three applications. One possible reason for this is that these other applications might be ongoing until the end of the schedule. Another possible reason is where an application continues until a particular task has been completed, for example, a payroll run has been finished. In this case, the resource manager is notified when the application has completed, and a Time End value can then be entered into Table 1, but it is not possible to define a precise end time in advance for such an application

TABLE 1

| Application | Time Start | Time End | Minimum Processing Requirement | Allocated Blade |
|---|---|---|---|---|
| A | 08:00 | | 0.5 | A |
| B | 10:00 | 12:00 | 1.5 | B + C |
| C | 10:00 | | 0.3 | C |
| D | 14:00 | | 1.3 | B + C |

The fourth column of Table 1 denotes the minimum processing requirement (in arbitrary units) for an application. This requirement may be derived from (a) actual hardware requirements needed to support the application; (b) an operator specification; and/or (c) a contractual requirement to ensure that a certain level of performance is always available for the application.

The final column of Table 1 specifies the particular blade 105 on which the resource manager 125 is planning to run the application. (For present purposes it is assumed that all four applications are to be run on node 101A, and that each of blades 105A, 105B and 105C has a processing capacity of one unit). From the schedule it can be seen that application A is assigned to run on blade 105A; application B is assigned to run on blades 105B and 105C (since it requires more processing power than can be provided by a single blade); application C is assigned to run on blade 105C; and application D is also assigned to blades 105B and 105C. Note that blades 105B and 105C do not have the capacity to run all three applications B, C, and D simultaneously, but since application B is scheduled to terminate before application D commences, there should not be any conflict.

It will be appreciated that although the schedule of Table 1 is presented in the form of a table, the schedule information may be stored in any appropriate format—e.g. as a database, a set of one or more queues, etc. In addition, the information provided in Table 1 is indicative only, and is provided for an understanding of the present invention. In other implementations, the resource manager may maintain additional or different schedule information for controlling the allocation of resources to applications.

Figure 3:
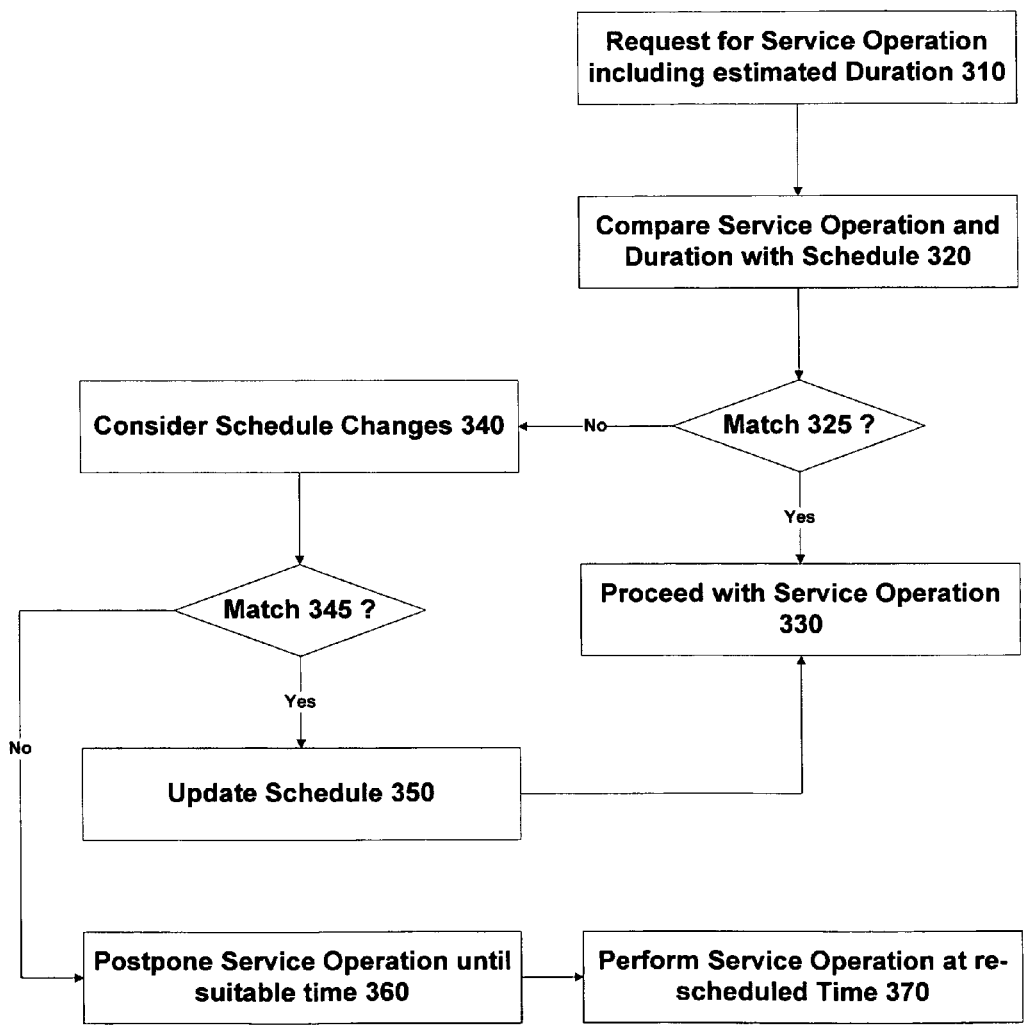
FIG. 3 is a flowchart showing in more detail a method for handling a requested service operation in accordance with one embodiment of the invention.

FIG. 3 is a flowchart illustrating a method for handling such a service operation on system 100 in accordance with one embodiment of the invention. The method commences with the resource manager receiving a request for a service operation (310). Such a request might be entered for example via operator terminal 150. The request includes an estimated duration for the service operation. The request may also include a desired (future) start time (as well as the estimated duration), or else it may be assumed that the service operation should be started straightaway, if possible. For present purposes, we shall assume that the requested service operation is to perform maintenance on power supply 108A, which would involve disconnecting it from node 101A. As previously mentioned, this would result in node 101A only being able to maintain operations on two out of the three blades 105. The requested duration is 60 minutes (say).

The determination of which resource(s) will be taken off-line for a given service operation may be performed by or with the assistance of the configuration manager 130, which can access configuration database 135 to determine the interdependencies between the different components in system 100. In the present case, where we are assuming that power supply 108A is to be serviced, the configuration manager 130 notifies the resource manager 125 that during the service operation only two of the three blades 105A, 105B, and 105C can be used.

More generally, the configuration manager determines the implications of the proposed service operation in terms of resource availability, since one or more components that are currently operational may become temporarily unavailable during the service operation. For example, if blade 105A were to be replaced or upgraded during the service operation, then blade 105A would be out of action during the service operation. In other cases, a component may become unavailable for indirect reasons. For example, assume that low speed network interface 109B fails. In order to remove this network interface and to install a replacement, it may perhaps be necessary to suspend operations on bus 106, which in turn would render high speed network interface 109A also unavailable. In this case, the predicted length of time for the service operation would correspond to the unavailability period of the high speed network interface 109A (not of the low speed network interface 109B, which is assumed to be already unavailable having failed).

After having received the request, including the identity of the resources that will become unavailable and the estimated duration, the resource manager now determines whether the proposed service operation is compatible with the current schedule (320) for the proposed start time and duration. For example, if the request for an immediate start on the power maintenance service operation is received at 11:30, the resource manager cannot accept such a request. In particular, at this time all three blades are in use according to the schedule of Table 1. As a result, we take the negative outcome from test 325, which causes the resource manager to see if the schedule can be changed to accommodate the requested service operation (340). For example, the resource manager might investigate whether the applications running across all three blades might fit onto two blades. However, it will be seen from Table 1 that applications A, B, and C have a combined processing requirement of 2.3 units, and so require all three blades 105A, 105B, and 105C to be available. Accordingly, the test of operation 345 is negative, and the resource manager sends a reply to postpone the service operation until a suitable time (360).

In determining whether or not a given time is suitable for proceeding with a given service operation (either initially, at operation 330 or following postponement, at operation 370), the resource manager reviews the start time when the resources become unavailable and also the predicted end time (based on the predicted duration) when they become available again. The service operation can be scheduled at the time in question, provided that this period of resource unavailability does not conflict with the work schedule on the resources.

For example, if the service operation for maintenance on power supply 108A is received at 12:15 and has a predicted duration of 60 minutes, then it will be noted that the resource manager can accept this request, since for the period from 12:15 to 13:15 only two blades are in operation (105A and 105C). Accordingly, it is acceptable for blade 105B to be off-line during this period.

It will be noted that accompanying the request for a service operation with the predicted duration of the service operation provides the resource manager 125 with very valuable information. For example, in the situation set out in Table 1 above, if no estimated duration is provided (as would be the case for conventional systems), the resource manager does not know that the requested service operation will complete before application D starts. Without such knowledge, the resource manager may have to take a pessimistic view as to the likely duration of the service operation; the resource manager would then refuse permission for the service operation in order to safeguard the start time of application D. Providing the estimated duration of a service request therefore enable a more sophisticated scheduling of service operations, and hence a more efficient use of system resources.

It will be appreciated that there may be some uncertainty in the predicted duration of a service operation, so that the resource manager may allow a suitable margin of error in making its scheduling decisions. In practice, some service operations have a fairly well defined duration. For example, if the service operation represents a system reboot, the time for such a re-boot is known with reasonable accuracy. Likewise, if the service operation is to replace one FRU with another FRU of the same type, and the service engineer is on-site with the relevant replacement FRU, then again the duration of this operation should be standard. Another possibility is where the engineer is not already on-site, but has a contractual response time, for example four hours. In such circumstances, the resource manager can make the conservative prediction that the service operation will be completed after the maximum time taken for the engineer to arrive, plus the time for the repair itself.

Note that in some cases, there may be no predicted time available for the service operation, for example because a fault has been detected but not yet diagnosed. In such circumstances, the resource manager may return to the pessimistic assumption of conventional systems, namely that the resources are being removed for an indefinite period (in effect, permanently), and decide whether or not to allow the service operation accordingly.

Although in some implementations the predicted service time may comprise a single number (duration), other embodiments may support more complex information structures. For example, it may be indicated that a service operation is predicted to take many hours to complete, but that this work will only be performed at night-time (when system usage is expected to be low), with the system unavailability unaffected during day-time (when system usage is expected to be high).

Another possibility is that the estimated duration comprises not only the time to perform the repair itself, but also the time until the repair can start. For example, it may be known that the service operation requires a particular part to be delivered from a warehouse, and that there is a daily delivery from this warehouse, so that the service operation can definitely start tomorrow. This sort of information is particularly helpful where the service operation is to repair a broken part (say component A), and the service operation itself needs to take down another device (say component B) for the duration of the service operation. In this case, the resource manager knows that component A is unavailable until after the service operation has completed, while component B is available until the start of the service operation, before being unavailable during the service operation, and then available again once the service operation has completed.

Although FIG. 3 primarily illustrates a situation where the resource manager 125 uses the work schedule and estimated duration to determine whether or not to accept the requested service operation, the resource manager may also utilise knowledge of the planned service operation to determine its scheduling. For example, the resource manager may be required to run an application, where the start time for the application is flexible, but where the application must run uninterrupted until completion. In this case, the resource manager can use its knowledge of a requested or planned service operation to when and/or whether to start the application. For example, if a service operation is planned for the next day and the application requires at least 36 hours to complete, then running the resource manager may postpone the scheduled launch of the application until after service operation has finished.

The resource manager 125 can obtain information about the predicted duration of the service operation from one or more sources. One possibility is that the operator or service engineer may enter the estimated duration of the service operation when entering the request for the service operation. Another possibility is that the resource manager itself has access to locally stored information about the duration. For example, the resource manager may maintain information about how long it takes a particular system to reboot, or a given FRU may maintain information about how long it takes to replace that particular FRU (this information might be stored in the FRU ID memory). Another possibility is that the resource manager could access such information from a remotely accessible database, for example over the Internet.

The format for specifying a duration to the resource manager can also be enhanced to cover the situation where the start and end-points of the service operation are not the same. Thus the description so far has focussed on the situation where at the start of the service operation component A (say) becomes unavailable, and then at the end of the service operation component A becomes available again. However, another possibility is where the service operation just removes component A, or replaces component A with a different device (say component B), which may be more or less powerful than component A. This can be modelled by notifying the resource manager that component A will become permanently unavailable from the start of the service operation, while component B will become newly available from the end time of the service operation (based on the start time and predicted duration of the service operation). The resource manager can then plan the use of the various resources of the system accordingly.

Figure 4:
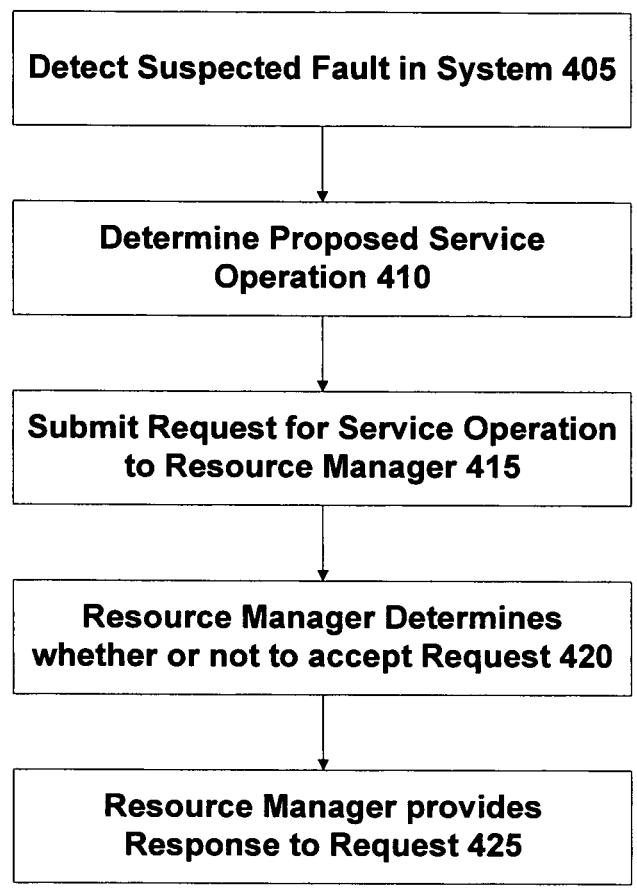
FIG. 4 provides a high-level flowchart showing the handling of a request for a service operation in the computer system of FIG. 1 in accordance with another embodiment of the invention involving a suspected fault.

FIG. 4 is a flowchart illustrating processing in system 100 to handle a service operation in accordance with another embodiment of the invention. The processing of FIG. 4 can be regarded as a variation of the processing shown in FIG. 2. In particular, the processing of FIG. 4 commences with a detection of a suspected fault in system 100 (405). This determination may be made automatically by system 100, for example by diagnosis system 160, or else by a human operator, such as a system administrator. Following the detection of the fault, a proposed service operation is determined (410). Note that the proposed service operation may be intended to correct the fault by replacing the component(s) suspected of being faulty. Alternatively, the proposed service operation may be intended just to mitigate the fault, for example to deconfigure the suspected component(s).

The determination of the proposed service operation may again be performed automatically by diagnosis unit 160 and/or by a human operator. In either case, the determination may involve the configuration manager 130 and the configuration database to help identify the location of the suspected fault within the system 100 and the resources that would be affected by the service operation.

Note that there may be some uncertainty about the precise nature or location of the fault. For example, the diagnosis unit might only be able to locate the fault to one of two components. Another possibility is that the diagnosis unit might not be certain that a fault is present (there might instead have been a temporary upset, such as a power glitch). In some embodiments, the diagnosis unit may provide an indication of its confidence level in the diagnosis. For example, if the same error has been seen repeatedly, this may lead to a higher confidence in the diagnosis of a fault.

Once a proposed service operation has been determined, an appropriate request for the service operation can be made to the resource manager (415). As previously discussed, this request may originate from any appropriate source, for example diagnosis system 160, operator terminal 150, configuration manager 130 and so on. Note that in conventional systems, the resource manager is not generally provided with any indication of the motivation for a requested service operation. However, in accordance with one embodiment of the present invention, the request supplied to the resource manager at operation 415 includes an indication that the request has been triggered by a suspected fault in the system.

In one implementation, the request submitted to the resource manager may incorporate a flag to indicate whether or not the request follows a suspected fault in the system. In other implementations, the resource manager may be provided with additional information. For example, the requested service operation might specify resources A, B, and C as becoming unavailable, with a flag per resource to indicate whether or not there is a suspected fault for that particular resource. In addition, rather than just using a flag to indicate a suspected fault, the request may incorporate further information (if available), such as a confidence level in the diagnosis of the fault. The request might also provide an indication of whether the component appears to be deteriorating (e.g. if the observed error rate is rising).

The resource manager now determines whether or not to accept the proposed service request (420). As previously discussed, accepting the request may involve the resource manager re-scheduling one or more applications running on system 100 in order to accommodate the request (and/or potentially trying to re-schedule the service operation itself). The resource manager can then provide an appropriate response to the request for the proposed service operation (425).

It will be appreciated that the provision of information regarding the suspected fault is of significant assistance to the resource manager 125 in determining whether or not to accept the proposed service operation. For example, absent such information, the resource manager might assume that the requested service operation represents routine maintenance that could be postponed without difficulty. However, as soon as the resource manager is alerted to the possibility of a fault within a system, it must treat the request with much greater urgency.

For example, if resource manager 125 is running an important application on blade 105A and receives a request to deconfigure or remove blade 105A, it might normally reject that request until the application has terminated. However, if the request also indicates that blade 105A has a suspected fault, the resource manager may decide to transfer the application to blade 105B or 105C as a precaution. Thus although such transfer might cause some disruption or delay to the application, this may well be more attractive than continuing to run the application on a faulty blade 105A. For example, if blade 105A is faulty, there is a risk of the application being delayed or producing incorrect results, or the application may crash, potentially with loss of data. In making its determination, the resource manager may also take into consideration factors such as the confidence level in the diagnosis (if available).

In one implementation, the operations of the resource manager 125 can be assisted by defining a set of "impact" levels for the proposed service operation:
a) no major impact—all services can be re-provisioned during and after the service operation, including maintaining redundancy and performance levels;
b) performance impact—services can be re-provisioned for the service operation, but there will be a clear performance impact (e.g. in response times). The practical severity of this degradation may be determined with reference to the service level agreement for the service. For example, if the performance levels were to drop below contracted values as a result of the proposed service operation, then the resource manager may decide to reject the proposed service operation, and continue utilization of the suspect resource(s). (However, it may nevertheless be feasible to swap services from one system to another, so that a less important service runs on the suspect resource(s)).
c) availability impact—services can be re-provisioned for the service operation, but redundancy is lost. This may lead to a lack of availability, as well as a degradation of system performance.

The resource manager can use the above classification of impact levels to categorise a requested service operation. The resource manager may also have policies that specify how to handle a service operation of a given category. For example, the resource manager might always accept a level (a) request; accept a level (b) request if from a human operator, but not from an automated system; and only accept a level (c) request subject to specific operator confirmation. Another possibility is that the resource manager might simply refer the impact level for a proposed service operation to the source of the request (e.g. a human operator or perhaps a box manager), which would then have ultimate responsibility for deciding whether or not to proceed with the service operation.

The approach described herein allows a resource manager to make more informed and reliable decisions regarding service operations, thereby helping to increase the efficient use of hardware resources. A variety of mechanisms for assisting the resource manager have been described, including providing an estimated duration of a service operation, providing an indication of a suspected fault, and providing an M from N selection. Note that any given computer system and resource manager may support one or more (or all) of these mechanisms.

Although the approach described herein has generally been presented in the context of computer systems, it is applicable to a very wide range of electronic apparatus. This includes a broad variety of computers, ranging from large-scale servers down to personal computers and beyond, as well as many computer-based electronic systems, such as telecommunications apparatus, subsystems for transport devices such as cars and aeroplanes, and so on. The approach can also be used for monitoring and controlling installations such as power stations, factories, office buildings, and so on.

The software components described herein may comprise program instructions and/or data instructions on some fixed, non-volatile storage, such as a hard disk or flash memory. These instructions and/or data structures can then be loaded for use into random access memory (RAM) for execution and use by a system processor, an application specific integrated circuit (ASIC), or by any other such device. Rather than being stored on a hard disk or other fixed device, part or all of the program instructions and/or data structures may also be stored on a removable storage medium, such as an optical (CD ROM, DVD, etc), magnetic (floppy disk, tape, etc), or semiconductor (removable flash memory) device. Alternatively, the program instructions and/or data structures may be downloaded via a transmission signal medium over a network, for example, a local area network (LAN), the Internet, and so on.

In conclusion, a variety of particular embodiments have been described in detail herein, but it will be appreciated that this is by way of illustration only. The skilled person will be aware of many further potential modifications and adaptations that fall within the scope of the claimed invention and its equivalents.

The invention claimed is:
1. A method for performing a service operation on a computer system that comprises a plurality of processing modules, comprising:
receiving, at a resource manager for the computer system, a request for performing a service operation on one or more resources of the processing modules, wherein the request individually identifies each of the resources without identifying processing modules affected by the service operation;

providing an estimated duration for the requested service operation;

submitting the request to a configuration manager, wherein, for each resource in a set of resources for the processing modules, the configuration manager maintains a mapping that identifies one or more of the processing modules that are affected by a service operation performed on the resource;

using the mappings to determine a set of the processing modules that will be affected by the service operation;

receiving, at the resource manager, a second request for the service operation, wherein the second request identifies a set N of the processing modules that are affected by the service operation and includes an indication that the service operation will render unavailable M out of the set of N processing modules, wherein the set N comprises a number N of the processing modules and the set M comprises a number M of the processing modules, and wherein the resource manager does not maintain any information that identifies processing modules that are affected by a service operation on resources; and determining whether or not to accept the request for the service operation based on the second request and a planned future usage of the one or more resources for the estimated duration of the service operation.

2. The method of claim 1, wherein said request is submitted to a resource manager for the system, wherein said resource manager determines whether or not to accepted the requested service operation.

3. The method of claim 1, wherein at least one resource is currently unavailable pending completion of the requested service operation, and providing the estimated duration for the requested service operation includes providing an estimated duration until the start of the requested service operation.

4. The method of claim 1, wherein providing an estimated duration for the service operation comprises storing the estimated duration in a database remotely accessible from the computer system.

5. The method of claim 1, wherein providing an estimated duration for the service operation comprises storing the estimated duration in a field replaceable unit to be replaced during the service operation.

6. The method of claim 1, further comprising using the estimated duration for the service operation to schedule workload on the computer system.

7. The method of claim 1, wherein the service operation replaces a first part by a second part, and the determination whether or not to accept the requested service operation is based on the first part being available until the service operation has started, and the second part being available after the estimated duration of the service operation.

8. A method comprising:

determining that at least one component within a computer system that comprises a plurality of components is suspected of having a fault, where said at least one component provides one or more resources for the computer system;

requesting removal of the one or more resources provided by the suspected component;

including within the request for removal an indication whether or not there is a suspected fault, wherein the request is received at a resource manager for the computer system, and wherein the request identifies the suspected component without identifying resources that are affected by a service operation on the suspected component;

submitting the request to a configuration manager, wherein, for each component in the plurality of components, the configuration manager maintains a mapping that identifies one or more of the resources that are affected by a service operation performed on the component;

using the mappings to determine a set of the resources that will be affected by the service operation;

receiving, at the resource manager, a second request for the service operation, wherein the second request identifies a set N of the resources that are affected by the service operation and includes an indication that the service operation will render unavailable M out of the set of N resources, wherein the set N comprises a number N of the resources and the set M comprises a number M of the resources, and wherein the resource manager does not maintain any information that identifies components that are affected by a service operation on resources; and deciding at a resource manager for the computer system whether or not to accept the requested removal, wherein said decision is based on the second request, the indication of the suspected fault, a planned future usage of the one or more resources, and the one or more resources that would be lost as a result of the requested removal.

9. The method of claim 8, wherein determining that a component is suspected of having a fault is performed by a diagnosis unit within the computer system.

10. The method of claim 8, wherein the removal request identifies which particular resources are provided by a component or components suspected of having a fault.

11. The method of claim 8, further comprising transferring services from a resource provided by a component with a suspected fault to another resource.

12. A method for performing a service operation on a computer system that comprises a plurality of resources, comprising:

receiving, at a resource manager for a computer system, a request for performing a service operation for one or more hardware components of the resources, wherein the request individually identifies each of the hardware components without identifying the resources that are affected by the service operation;

submitting the request to a configuration manager, wherein, for each hardware component in a set of hardware components for the plurality of resources, the configuration manager maintains a mapping that identifies one or more of the resources that are affected by a service operation performed on the hardware component;

using the mappings to determine a set of the resources that will be affected by the service operation;

receiving, at the resource manager, a second request for the service operation, wherein the second request identifies a set N of the resources that are affected by the service operation, and wherein the resource manager does not maintain any information that identifies resources that are affected by a service operation on hardware components;

including within the second request an indication that of the N resources, M will be unavailable during the service operation, wherein the set N comprises a number N of the resources and the set M comprises a number M of the resources; and determining whether or not to accept the requested service operation based on the second request and a planned future usage of one or more of the N resources.

13. The method of claim 12, further comprising providing a reply to the request, said reply accepting the requested service operation and indicating which M of the N resources should be unavailable during the service operation.

14. The method of claim 12, further comprising providing a reply to the request, said reply accepting the requested service operation and specifying up to N-M resources that should not be unavailable during the service operation.

15. The method of claim 12, wherein said indication does not specify which M of the N resources are to be unavailable.

16. A computer system comprising:
a processor;
memory coupled to the processor; and
a resource manager configured to receive a request for performing a service operation for one or more hardware components for a plurality of computers, wherein the request individually identifies each of the hardware components without identifying the computers for the hardware components;
a configuration manager configured to receive the request from the resource manager, wherein for each hardware component in a set of hardware components for the plurality of computers, the configuration manager maintains a mapping that identifies one or more of the computers that are affected by a service operation performed on the hardware component;
wherein the configuration manager is further configured to use the mappings to determine a set of the computers that will be affected by the service operation;
wherein the configuration manager is further configured to send a second request for performing the service operation on one or more resources of the computer system to the resource manager, wherein the second request includes an indication that the service operation will render M out of N of the computers that will be affected by the service operation unavailable, wherein N is a number of the computer that will be affected by the service operation and M is a number of the computers that the service operation will render unavailable; and
wherein the resource manager is configured to determine whether or not to accept the requested service operation based on information included within the second request and a planned future usage of the one or more resources, and wherein the resource manager does not maintain any information that identifies computers that are affected by a service operation on hardware components.

17. A non-transitory computer program product comprising program instructions on a medium, wherein said instructions are executable by a machine to perform a method for handling a service operation on one or more resources of a computer system that comprises a plurality of resources, the method comprising:
receiving, at a resource manager for the computer system, a first request for performing a service operation for one or more resources of the computers, wherein the first request individually identifies each of the resources without identifying computers for the resources;
submitting the first request to a configuration manager, wherein, for each resource in a set of resources for the plurality of computers, the configuration manager maintains a mapping that identifies one or more of the computers that are affected by a service operation performed on the resource;
using the mappings to determine a set of the resources that will be affected by the service operation;
receiving, at the resource manager, a second request for the service operation, wherein the second request includes an indication that the service operation will render M out of N specified resources unavailable, wherein N is a number of the resources that will be affected by the service operation and M is a number of the resources that the service operation will render unavailable;
and determining at the resource manager whether or not to accept the requested service operation based on information included within the second request and a planned future usage of the one or more resources, wherein the resource manager does not maintain any information that identifies computers that are affected by a service operation on resources.

\* \* \* \* \*